(12) United States Patent
Truc et al.

(10) Patent No.: US 7,171,115 B2
(45) Date of Patent: Jan. 30, 2007

(54) CD INDEX PRINT LABEL

(75) Inventors: James A. Truc, Eden Prairie, MN (US); Cal Wright, Minnetonka, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/630,049

(22) Filed: Jul. 30, 2003

(65) Prior Publication Data

US 2004/0021907 A1    Feb. 5, 2004

Related U.S. Application Data

(63) Continuation of application No. 10/124,047, filed on Apr. 17, 2002, now abandoned, which is a continuation-in-part of application No. 09/176,143, filed on Oct. 21, 1998, now abandoned.

(51) Int. Cl.
*G03D 13/00* (2006.01)
*G03D 27/52* (2006.01)
*G11B 7/24* (2006.01)

(52) U.S. Cl. .................... 396/661; 720/718; 355/40; 369/273

(58) Field of Classification Search ............... 396/429, 396/322, 661; 355/40; 369/273; 720/718
See application file for complete search history.

(56) References Cited

U.S. PATENT DOCUMENTS

| | | | |
|---|---|---|---|
| 4,805,039 A | 2/1989 | Otake et al. | 358/335 |
| 5,031,773 A | 7/1991 | Manico et al. | 206/455 |
| 5,259,504 A | 11/1993 | Manico | 206/455 |
| 5,316,464 A | 5/1994 | Lexell | 425/318 |
| 5,317,337 A * | 5/1994 | Ewaldt | 347/2 |
| 5,400,152 A | 3/1995 | Manico et al. | 358/501 |
| 5,459,819 A | 10/1995 | Watkins et al. | 395/117 |
| 5,518,325 A * | 5/1996 | Kahle | 400/70 |
| 5,530,793 A | 6/1996 | Watkins et al. | 395/117 |
| 5,617,171 A | 4/1997 | Ishikawa et al. | 396/512 |
| 5,623,581 A | 4/1997 | Attenberg | 395/106 |
| 5,706,097 A | 1/1998 | Schelling et al. | 358/296 |
| 5,715,511 A | 2/1998 | Aslam et al. | 399/320 |
| 5,715,934 A | 2/1998 | Tobol et al. | 206/232 |
| 5,770,289 A | 6/1998 | Tracy | 428/40.1 |
| 5,781,221 A * | 7/1998 | Wen et al. | 347/232 |
| 5,788,074 A | 8/1998 | Tanabe et al. | 206/455 |
| 5,797,688 A | 8/1998 | Wen | |
| 5,798,161 A | 8/1998 | Kita et al. | 428/64.1 |

(Continued)

FOREIGN PATENT DOCUMENTS

EP    0 532 997 A1    4/1992

(Continued)

*Primary Examiner*—Christopher Mahoney
(74) *Attorney, Agent, or Firm*—David A. Novais; Kathleen Neuner-Manne (57) ABSTRACT

An index print of photographic images is created on a CD containing digital data representing those images. Photographic images are digitized to produce digital image data which is stored on the CD. This digital image data is also used to create an index print containing thumbnail images of all of the photographs stored on the CD. The index print is then affixed to the top surface of the CD either by being printed on a label that is adhered to the disk surface, or by being printed directly on the surface of the disk.

31 Claims, 3 Drawing Sheets

U.S. PATENT DOCUMENTS

| | | | |
|---|---|---|---|
| 5,799,982 A | 9/1998 | McClure et al. | 283/81 |
| 5,806,222 A | 9/1998 | Shaffer | 40/638 |
| 5,809,003 A | 9/1998 | Taira et al. | 369/275.1 |
| 5,816,392 A | 10/1998 | Kawagoe et al. | 206/232 |
| 5,828,442 A | 10/1998 | Wess | 355/40 |
| 5,854,175 A * | 12/1998 | DeBoer et al. | 503/227 |
| 6,019,151 A * | 2/2000 | Wen et al. | 156/387 |
| 6,088,136 A * | 7/2000 | Kraft et al. | 358/506 |
| 2002/0122378 A1 * | 9/2002 | Kubo | 369/273 |

FOREIGN PATENT DOCUMENTS

EP    0 532 998 A1    9/1992

* cited by examiner

CD INDEX PRINT LABEL

CROSS-REFERENCE TO RELATED APPLICATION(S)

This is a continuation of U.S. application Ser. No. 10/124,047 filed Apr. 17, 2002 now abandoned, which is a continuation of U.S. application Ser. No. 09/176,143 filed Oct. 21, 1998 now abandoned.

BACKGROUND OF THE INVENTION

This invention involves compact disk (CD) labels, specifically index print labels for CDs that are used to store photographs.

Recent technology makes it possible to digitize and store photographic images on digital media such as compact disks (CDs). Problems arise when a user wishes to find a particular photographic image on a CD. Unlike the negatives of the past, it is not possible to determine by looking at the disk which photographs are stored on it. When a user has several CDs with 24 or 36 images on each. It is difficult and time consuming to locate a specific image.

Though it is possible to get a small print containing thumbnail images and put this print in the jewel case that holds the CD, many times a CD becomes separated from its jewel case. In some instances, CDs are not stored in jewel cases at all but rather in other types of CD holders which contain only a place for the CD, but not any accompanying information or literature that goes along with it. In other instances, the CD is taken out of its jewel case but not returned to it, or returned to the wrong one.

BRIEF SUMMARY OF THE INVENTION

This invention consists of a CD containing several photographic images. To aid the user in identifying which images are stored on what CD, an index print label is created. The index print label contains thumbnail images representing each photograph appearing on the CD. The individual images are identified by number to aid the user in locating that particular photograph on the disk.

In creating the index print label, the process begins with digitizing the photographic images to produce digital image data. This image data is then stored on the CD. The image data is also used to create an index print. The index print is then printed on a sticker that is adhered to the CD. Alternatively, the index print can be printed directly onto the CD.

The CD index print label is shaped so that it can be placed on top of the CD without interfering with the CD's center ring. The label can also be shaped so that it does not cover the entire surface of the CD, leaving space for other indicia, such as company name, telephone number, or address.

DETAILED DESCRIPTION

Figure 1:
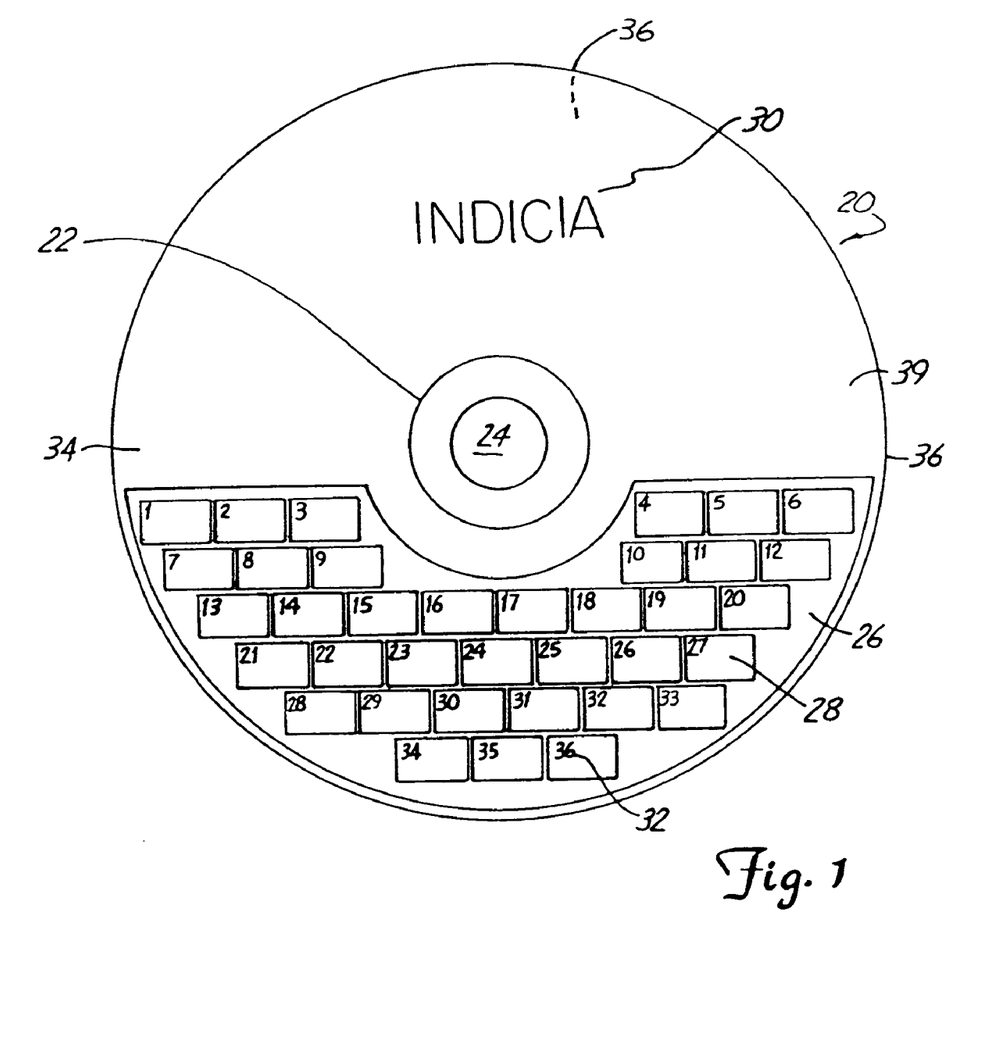
FIG. 1 is a top plan view of a photographic CD with a CD index print label.

FIG. 1 shows a photo CD 20 with a CD index print label 26. The photo CD 20 is so called because it stores photographic images. The photographic images have been digitized to produce digital image data, either by scanning a photograph or film negative or by using a digital camera. The index print label 26 consists of thumbnail images 28 that are numbered with an image number 32. The thumbnail images 28 correspond to the photographic images appearing on the photo CD 20, with each image 28 representing certain digital image data on the photo CD 20. The image number 32 aids the user in finding that photographic image on the photo CD 20 in that the image number 32 corresponds to the location of the digital image data representing that photographic image.

The label 26 does not touch or cover inner ring 22 or center hole 24 of photo CD 20, so the photo CD 20 remains fully functional. Furthermore, the index print label 26 is on the top surface 34 of the photo CD 20 so that the bottom readable surface 36 remains usable. The images 28 are oriented so that a user can easily view them all when holding the photo CD 20. The label does not cover all of the CD's top surface 34, so that space is left for other indicia 30, such as name, phone number or address.

Figure 2:
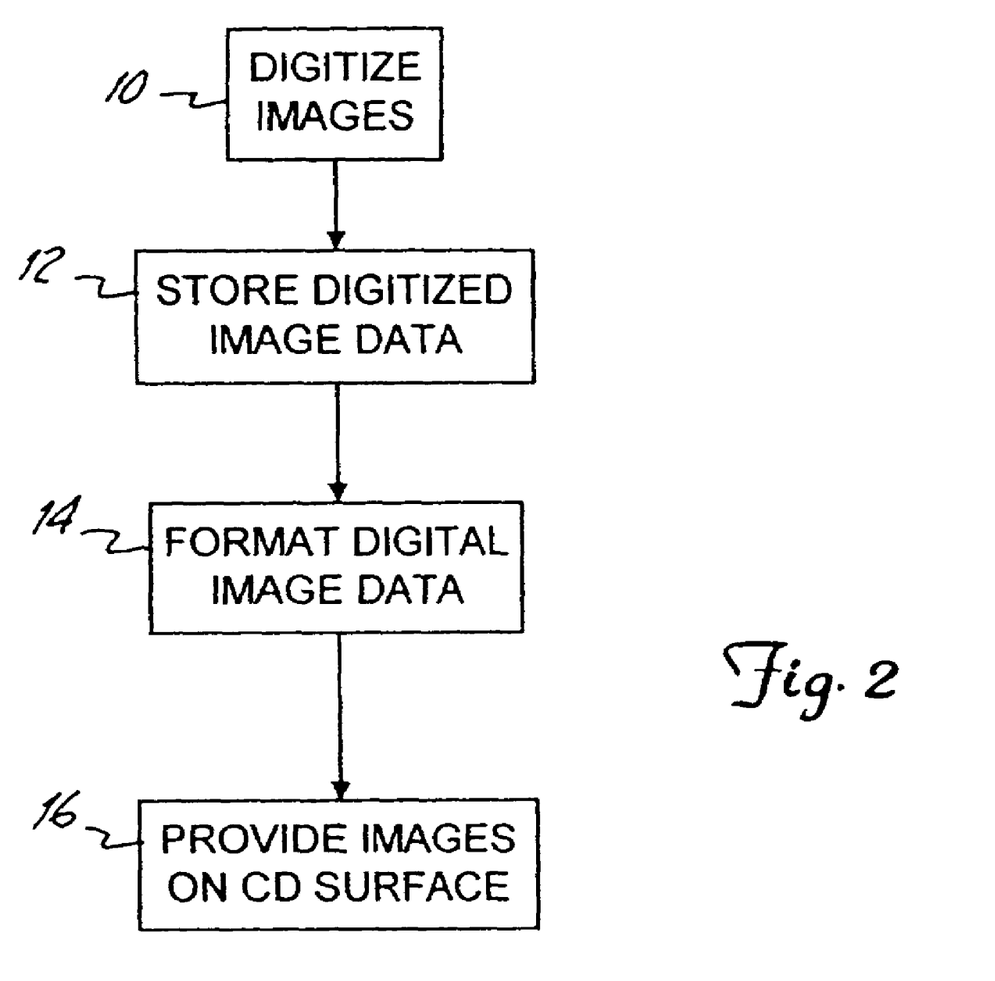
FIG. 2 is a flow diagram showing the process for creating a CD index print label.

FIG. 2 shows a flow diagram explaining the process of making CD index print label 26. First step 10 is digitizing images to produce digital image data. Second step 12 is storing the digital image data on a digital disk medium, such as a CD. Third step 14 is formatting the digital image data to form an index print. The index print label 26 is shaped to fit the CD and thus in formatting the index print, the images 28 must be sized and arranged to fit on the label 26.

Fourth step 16 is providing the images on the CD's top surface 34. This can be done either by printing the label directly onto the CD's top surface 34, or by printing a sticker that can be attached to the CD's top surface 34. When printing the label directly onto the CD's top surface 34, the formatted digital image data is sent to a printer capable of printing on a CD. One such printer is the Cedar Desktop CD/R Publisher. The printer prints the index label and the CD is dispensed for use. When printed as a sticker, the formatted digital image data is likewise sent to a printer. The printer used can be an ink jet printer, or similar machine, capable of printing at least 300 dpi. The printer is provided with sticker label material, most likely some form of paper with an adhesive coating on the bottom surface, and the sticker label is printed. The sticker label is then applied to the CD.

Figure 3:
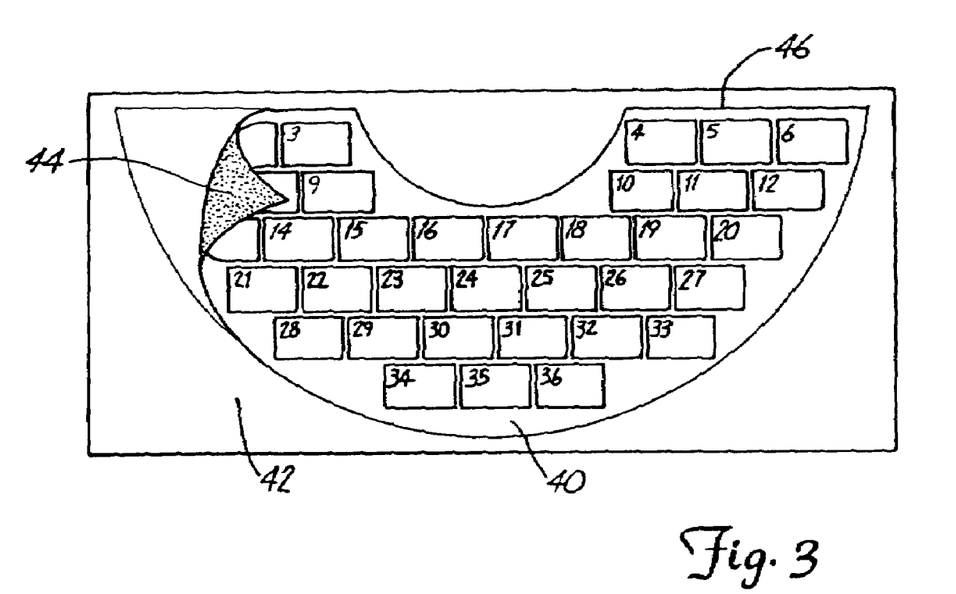
FIG. 3 is an illustration of one embodiment of the CD index print label showing a top view of the index print label.

FIG. 3 shows one embodiment where the sticker label is self adhesive. The sticker label 40 has precut edges 46 that allow the label 40 to be peeled from backing 42. An adhesive layer 44 on the bottom surface of the label 40 allows label 40 to be adhered to the top of a photo CD 20. There are many options for this adhesive layer commonly known to those skilled in the art. The sticker label material must be thin enough to prevent an affixed label from affecting the performance of the CD in disk drives. There are also many options for the sticker label 40 material and backing 42 commonly known to those skilled in the art.

Thus, the present invention is an improvement in the art in that it provides for making a label containing an index print and placing it directly onto the CD. In this manner, the index print never gets separated from the CD.

Although the present invention has been described with reference to preferred embodiments, workers skilled in the art will recognize that changes may be made in form and detail Without departing from the spirit and scope of the invention.

The invention claimed is:

1. A method for creating an index print label for a digital image storage disk, the method comprising the steps of:
digitizing photographic images to produce digital image data representative of the photographic images;
storing the digital image data on a first surface of a digital image storage disk, such that the photographic images represented by the digital image data stored on the first surface of the digital image storage disk are not readable by a human; and
providing, on a second surface of the digital image storage disk, positive images which correspond to the digital image data, so that each of the positive images directly visually represent the photographic images stored on the digital image storage disk, said positive images being provided on said second surface so as to be viewable by a human while holding the digital image storage disk;
wherein:
said positive images are provided on said digital image storage disk so as to define a plurality of parallel rows on said disk, at least a first row of said plurality of rows beginning at a first location on said disk and ending at a second location on said disk which is between said first location and a center axis of said disk, such that said second location is on a first side of said center axis; and at least a second row of said plurality of rows beginning at a third location on said disk and ending at a fourth location on said disk that is opposite to said third location, such that said fourth location is on a second side of said center axis which is opposite to said first side;
each of said plurality of rows comprises a plurality of said positive images, with a space being defined between each of said positive images, each of said rows being provided on said disk in a manner in which each of the spaces between the positive images in one row are offset from each of the spaces between the positive images in another row; and
the positive images are provided by printing them directly on a first portion of the second surface of the digital image storage disk and indicia is provided on a second portion of the second surface of the digital image storage disk.

2. A method for creating an index print label for a digital image storage disk, the method comprising the steps of:
digitizing photographic images to produce digital image data representative of the photographic images;
storing the digital image data on a first surface of a digital image storage disk, such that the photographic images represented by the digital image data stored on the first surface of the digital image storage disk are not readable by a human; and
providing, on a second surface of the digital image storage disk, positive images which correspond to the digital image data, so that each of the positive images directly visually represent the photographic images stored on the digital image storage disk, said positive images being provided on said second surface so as to be viewable by a human while holding the digital image storage disk;
wherein:
said positive images are provided on said digital image storage disk so as to define a plurality of parallel rows on said disk, at least a first row of said plurality of rows beginning at a first location on said disk and ending at a second location on said disk which is between said first location and a center axis of said disk, such that said second location is on a first side of said center axis; and at least a second row of said plurality of rows beginning at a third location on said disk and ending at a fourth location on said disk that is opposite to said third location, such that said fourth location is on a second side of said center axis which is opposite to said first side;
each of said plurality of rows comprises a plurality of said positive images, with a space being defined between each of said positive images, each of said rows being provided on said disk in a manner in which each of the spaces between the positive images in one row are offset from each of the spaces between the positive images in another row; and
the positive images are provided by printing a label sticker and adhering the label sticker to a first portion of the second surface of the digital image storage disk and indicia is provided on a second portion of the second surface of the digital image storage disk.

3. A digital image storage disk comprising:
a first surface containing digital image data representing a plurality of photographic images, such that the photographic images represented by the digital image data stored on the first surface of the digital image storage disk are not readable by a human; and
an array of printed images on a second surface of the digital image storage disk, the printed images visually representing the plurality of photographic images stored on the first surface of the digital image storage disk as said digital image data, said printed images being provided on said second surface of the digital image storage disk so as to be viewable by a human while holding the digital image storage disk, so as to provide for a human readable representation of each of the photographic images stored on the first surface of the digital image storage disk;
wherein:
said printed images provided on said digital image storage disk are provided on said disk so as to define a plurality of parallel rows on said disk, at least a first row of said plurality of rows beginning at a first location on said disk that is in a vicinity of a first point on an outer perimeter of said disk and ending at a second location on said disk which is between said first location and a center axis of said disk, such that said second location is on a first side of said center axis; and at least a second row of said plurality of rows beginning at a third location on said disk that is in a vicinity of a second point on the outer perimeter of said disk and ending at a fourth location on said disk that is opposite to said third location and is in a vicinity of a third point on the outer perimeter of the disk, such that said fourth location is on a second side of said center axis which is opposite to said first side;
each of said plurality of rows comprises a plurality of said printed images, with a space being defined between each of said printed images, each of said rows being provided on said disk in a manner in which each of the spaces between the printed images in one row are offset from each of the spaces between the printed images in another row; and
the array of printed images representing the plurality of photographic images is printed directly onto a first portion of the second surface of the disk and indicia is provided on a second portion of the second surface of the digital image storage disk.

4. The disk of claim 3, wherein each image in the array contains an image number which corresponds to a location of the digital image data on the disk.

5. A digital image storage disk comprising:
   a first surface containing digital image data representing a plurality of photographic images, such that the photographic images represented by the digital image data stored on the first surface of the digital image storage disk are not readable by a human; and
   an array of printed images on a second surface of the digital image storage disk, the printed images visually representing the plurality of photographic images stored on the first surface of the digital image storage disk as said digital image data, said printed images being provided on said second surface of the digital image storage disk so as to be viewable by a human while holding the digital image storage disk, so as to provide for a human readable representation of each of the photographic images stored on the first surface of the digital image storage disk;
   wherein:
   said printed images provided on said digital image storage disk are provided on said disk so as to define a plurality of parallel rows on said disk, at least a first row of said plurality of rows beginning at a first location on said disk that is in a vicinity of a first point on an outer perimeter of said disk and ending at a second location on said disk which is between said first location and a center axis of said disk, such that said second location is on a first side of said center axis; and at least a second row of said plurality of rows beginning at a third location on said disk that is in a vicinity of a second point on the outer perimeter of said disk and ending at a fourth location on said disk that is opposite to said third location and is in a vicinity of a third point on the outer perimeter of the disk, such that said fourth location is on a second side of said center axis which is opposite to said first side;
   each of said plurality of rows comprises a plurality of said printed images, with a space being defined between each of said printed images, each of said rows being provided on said disk in a manner in which each of the spaces between the printed images in one row are offset from each between the printed images in the spaces of another row; and
   the array of printed images representing the plurality of photographic images is printed on a label sticker that is affixed to a first portion of the second surface of the disk and indicia is provided on a second portion of the second surface of the digital image storage disk.

6. A digital image storage disk comprising:
   a first side which includes a first surface adapted to store a plurality of photographic images as digital image data, such that said photographic images stored on said first surface as digital image data are not viewable by a human;
   a second side opposite to said first side, said second side including a second surface; and
   an index print provided on said second surface of the disk, said index print comprising a plurality of positive images which visually directly represent the plurality of photographic images stored on the first surface of the disk as digital image data, said index print being provided on said second surface of said disk so that said plurality of positive images are viewable by a human while holding the disk, so as to provide for a human readable representation of each of the photographic images stored on the first surface of the disk;
   wherein:
   said positive images provided on said digital image storage disk are provided on said disk so as to define a plurality of parallel rows on said disk, at least a first row of said plurality of rows beginning at a first location on said disk and ending at a second location on said disk which is between said first location and a center axis of said disk, such that said second location is on a first side of said center axis; and at least a second row of said plurality of rows beginning at a third location on said disk and ending at a fourth location on said disk that is opposite to said third location, such that said fourth location is on a second side of said center axis which is opposite to said first side; and
   each of said plurality of rows comprises a plurality of said positive images, with a space being defined between each of said positive images, each of said rows being provided on said disk in a manner in which each of the spaces between the positive images in one row are offset from each of the spaces between the positive images in another row.

7. A disk according to claim 6, wherein said index print defines an arcuate shape.

8. A disk according to claim 6, wherein said index print is a label that is adhered to the second surface of the disk.

9. A disk according to claim 6, wherein said index print is printed directly onto the second surface of the disk.

10. A method for creating an index print label for a digital image storage disk, the method comprising the steps of:
    digitizing photographic images to produce digital image data representative of the photographic images;
    storing the digital image data on a first surface of a digital image storage disk, such that the photographic images represented by the digital image data stored on the first surface of the digital image storage disk are not readable by a human; and
    providing, on a second surface of the digital image storage disk, positive images which correspond to the digital image data, so that each of the positive images directly visually represent the photographic images stored on the digital image storage disk, said positive images being provided on said second surface so as to be viewable by a human while holding the digital image storage disk;
    wherein:
    said positive images are provided on said digital image storage disk so as to define a plurality of rows on said disk, and at least two orthogonal planes extend along a center axis of said disk, at least a first row of said plurality of rows defines a first longitudinal axis which is perpendicular to one of said orthogonal planes, said first row beginning and ending on one side of said one orthogonal plane, and at least a second row of said plurality of rows defines a second longitudinal axis which is perpendicular to said one orthogonal plane, said second row beginning on said one side of said one orthogonal plane and ending on an opposite second side of said one orthogonal plane; and
    each of said plurality of rows comprises a plurality of said positive images, with a space being defined between each of said positive images, each of said rows being provided on said disk in a manner in which each of the spaces between the positive images in one row are offset from each of the spaces between the positive images in another row.

11. The method of claim 10, wherein the positive images are provided by printing them directly on the second surface of the digital image storage disk.

12. The method of claim 10, wherein the positive images are provided by printing a label sticker and adhering the label sticker to the second surface of the digital image storage disk.

13. A digital image storage disk comprising:
a first surface containing digital image data representing a plurality of photographic images, such that the photographic images represented by the digital image data stored on the first surface of the digital image storage disk are not readable by a human; and
an array of printed images on a second surface of the digital image storage disk, the printed images visually representing the plurality of photographic images stored on the first surface of the digital image storage as said digital image data, said printed images being provided on said second surface of the digital image storage disk so as to be viewable by a human while holding the digital image storage disk, so as to provide for a human readable representation of each of the photographic images stored on the first surface of the digital image storage disk;
wherein:
said printed images are provided on said digital image storage disk so as to define a plurality of rows on said disk, and at least two orthogonal planes extend along a center axis of said disk, at least a first row of said plurality of rows defining a first longitudinal axis which is perpendicular to one of said two orthogonal planes, said first row beginning and ending on one side of said one orthogonal plane, at least a second one of said plurality of rows defining a second longitudinal axis which is perpendicular to said one orthogonal plane, said second row beginning on one side of said one orthogonal plane and ending on an opposite second side of said one orthogonal plane; and
each of said plurality of rows comprises a plurality of said printed images, with a space defined between each of said printed images, each of said rows being provided on said disk in a manner in which each of the spaces between the printed images in one row are offset from each of the spaces between the printed images in another row.

14. The disk of claim 13, wherein the array of printed images representing the plurality of photographic images is printed directly onto the second surface of the disk.

15. The disk of claim 13, wherein the array of printed images representing the plurality of photographic images is printed on a label sticker that is affixed to the second surface of the disk.

16. The disk of claim 13, wherein each image in the array contains an image number which corresponds to a location of the digital image data on the disk.

17. A digital image storage disk comprising:
a first side which includes a first surface adapted to store a plurality of photographic images as digital image data, such that said photographic images stored on said first surface as digital image data are not viewable by a human;
a second side opposite to said first side, said second side including a second surface; and
an index print provided on said second surface of the digital image storage disk, said index print comprising a plurality of positive images which visually represent the plurality of photographic images stored on the first surface of the digital image storage disk as digital image data, said index print being provided on said second surface of said digital image storage disk so that said plurality of positive images are viewable by a human while holding the digital image storage disk, so as to provide for a human readable representation of each of the photographic images stored on the first surface of the digital image storage disk;
wherein
said positive images are provided on said digital image storage disk so as to define a plurality of rows on said disk, and at least two orthogonal planes extend along a center axis of said disk, at least a first row of said plurality of rows defining a first longitudinal axis which is perpendicular to one of said two orthogonal planes, said first row beginning and ending on one side of said one orthogonal plane, at least a second row of said plurality of rows defining a second longitudinal axis which is perpendicular to said one orthogonal plane, said second row beginning on said one side of said one orthogonal plane and ending on an opposite second side of said one orthogonal plane; and
each of said plurality of rows comprises a plurality of said positive images, with a space being defined between each of said positive images, each of said rows being provided on said disk in a manner in which each of the spaces between the positive images in one row are offset from each of the spaces between the positive images in another row.

18. A disk according to claim 17, wherein said index print defines an arcuate shape.

19. A disk according to claim 17, wherein said index print is a label that is adhered to the second surface of the disk.

20. A disk according to claim 17, wherein said index print is printed directly onto the second surface of the disk.

21. A method for creating an index print label for a digital image storage disk, the method comprising the steps of:
digitizing photographic images to produce digital image data representative of the photographic images;
storing the digital image data on a first surface of a digital image storage disk having the first surface, a second surface, and an inner ring, such that the photographic images represented by the digital image data stored on the first surface of the digital image storage disk are not readable by a human; and
providing on the second surface of the digital image storage disk positive images which visually represent the digital image data, so that each of the positive images directly represent the photographic images stored on the digital image storage disk, said positive images being provided on said second surface so as to be viewable by a human while holding the digital image storage disk;
wherein said positive images are provided in a plurality of rows on the second surface of the disk, and at least two orthogonal planes are defined along a center axis of said disk, at least a first positive image of said positive images being located on a first side of one of said orthogonal planes, and at least a second positive image of said positive images being provided on a second side of said one orthogonal plane which is opposite to said first side; and
wherein each of said plurality of rows comprises a plurality of said positive images, with a space being defined between each of said positive images, each of said rows being provided on said disk in a manner in which each of the spaces between the positive images in one row are offset from each of the spaces between the positive images in another row, and the positive images are provided on a first portion of the second surface of the digital image storage disk and indicia is provided on a second portion of the second surface of the digital image storage disk.

22. The method of claim 21, wherein the positive images are provided by printing them directly on the second surface of the digital image storage disk.

23. The method of claim 21, wherein the positive images are provided by printing a label sticker and adhering the label sticker to the second surface of the digital image storage disk.

24. A digital image storage disk comprising:

a first surface containing digital image data representing a plurality of photographic images, such that the photographic images represented by the digital image data stored on the first surface of the disk are not readable by a human;

an array of printed images on a second surface of the disk, the printed images visually representing the plurality of photographic images stored on the first surface of the disk as said digital image data, said printed images being provided on said second surface of the disk so as to be viewable by a human while holding the disk, so as to provide for a humanreadable representation of each of the photographic images stored on the first surface of the disk; and an inner ring;

wherein said printed images are provided in a plurality of rows on the second surface of the disk, and at least two orthogonal planes are defined along a center axis of said disk, at least a first positive image of said positive images being located on a first side of one of said orthogonal planes, and at least a second positive image of said positive images being provided on a second side of said one orthogonal plane which is opposite to said first side; and wherein each of said plurality of rows comprises a plurality of said printed images, with a space being defined between each of said printed images, each of said rows being provided on said disk in a manner in which each of the spaces between the printed images in one row are offset from each of the spaces between the printed images in another row, and the positive images are provided on a first portion of the second surface of the digital image storage disk and indicia is provided on a second portion of the second surface of the digital image storage disk.

25. The disk of claim 24, wherein the array of printed images representing the plurality of photographic images is printed directly onto the second surface of the disk.

26. The disk of claim 24, wherein the array of printed images representing the plurality of photographic images is printed on a label sticker that is affixed to the second surface of the disk.

27. The disk of claim 24, wherein each image in the array contains an image number which corresponds to a location of the digital image data on the disk.

28. A digital image storage disk comprising:

a first side which includes a first surface adapted to store a plurality of photographic images as digital image data, such that said photographic images stored on said first surface as digital image data are not viewable by a human;

a second side opposite to said first side, said second side including a second surface;

an inner ring; and an index print provided on said second surface of the disk, said index print comprising a plurality of positive images which visually represent the plurality of photographic images stored on the first surface of the disk as digital image data, said index print being provided on said second surface of said disk so that said plurality of positive images are viewable by a human while holding the disk, so as to provide for a human readable representation of each of the photographic images stored on the first surface of the disk;

wherein said positive images are provided in a plurality of rows on the second surface of the disk, and at least two orthogonal planes are defined along a center axis of said disk, at least a first positive image of said positive images being located on a first side of one of said orthogonal planes, and at least a second positive image of said positive images being provided on a second side of said one orthogonal plane which is opposite to said first side; and wherein each of said plurality of rows comprises a plurality of said positive images, with a space being defined between each of said positive images, each of said rows being provided on said disk in a manner in which each of the spaces between the positive images in one row are offset from each of the spaces between the positive images in another row, and the positive images are provided on a first portion of the second surface of the digital image storage disk and indicia is provided on a second portion of the second surface of the digital image storage disk.

29. A disk according to claim 28, wherein said index print defines an arcuate shape.

30. A disk according to claim 28, wherein said index print is a label that is adhered to the second surface of the disk.

31. A disk according to claim 28, wherein said index print is printed directly onto the second surface of the disk.

* * * * *

UNITED STATES PATENT AND TRADEMARK OFFICE
CERTIFICATE OF CORRECTION

| | | |
|---|---|---|
| PATENT NO. | : 7,171,115 B2 | Page 1 of 1 |
| APPLICATION NO. | : 10/630049 | |
| DATED | : January 30, 2007 | |
| INVENTOR(S) | : James A. Truc et al. | |

It is certified that error appears in the above-identified patent and that said Letters Patent is hereby corrected as shown below:

Claim 24, Column 9, Line 26      In Claim 24, delete "humanreadable" and insert -- human readable --, therefor.

Signed and Sealed this

Twenty-first Day of August, 2007

JON W. DUDAS
*Director of the United States Patent and Trademark Office*